April 13, 1926.

J. FASSIO 1,580,476

WASHING APPARATUS

Filed July 28, 1923      2 Sheets-Sheet 1

WITNESS:
H. Sherburne

INVENTOR
Julius Fassio.
BY White Prost Evans
his ATTORNEYS.

April 13, 1926. 1,580,476

J. FASSIO

WASHING APPARATUS

Filed July 28, 1923 2 Sheets-Sheet 2

INVENTOR
Julius Fassio
BY
his ATTORNEYS.

WITNESS:

Patented Apr. 13, 1926.

1,580,476

UNITED STATES PATENT OFFICE.

JULIUS FASSIO, OF SAN FRANCISCO, CALIFORNIA.

WASHING APPARATUS.

Application filed July 28, 1923. Serial No. 654,488.

*To all whom it may concern:*

Be it known that I, JULIUS FASSIO, a citizen of the United States, and a resident of the city and county of San Francisco, State of California, have invented a certain new and useful Washing Apparatus, of which the following is a specification.

The invention relates to a washing apparatus comprising principally a kitchen sink.

An object of the invention is to provide a kitchen sink with means whereby clothes may be washed in the sink without manual effort.

Another object of the invention is to provide a kitchen sink with means whereby the sink may be used as a clothes washer or a dish washer.

Another object of the invention is to provide a convertible washing apparatus.

The invention possesses other advantageous features, some of which with the foregoing, will be set forth at length in the following description, where I shall outline in full that form of the invention which I have selected for illustration in the drawings accompanying and forming part of the present description. In said drawings I have shown one form of apparatus embodying my invention, but it is to be understood that I do not limit myself to such form, since the invention, as set forth in the claims, may be embodied in a plurality of forms.

Referring to said drawings.

Figure 1:
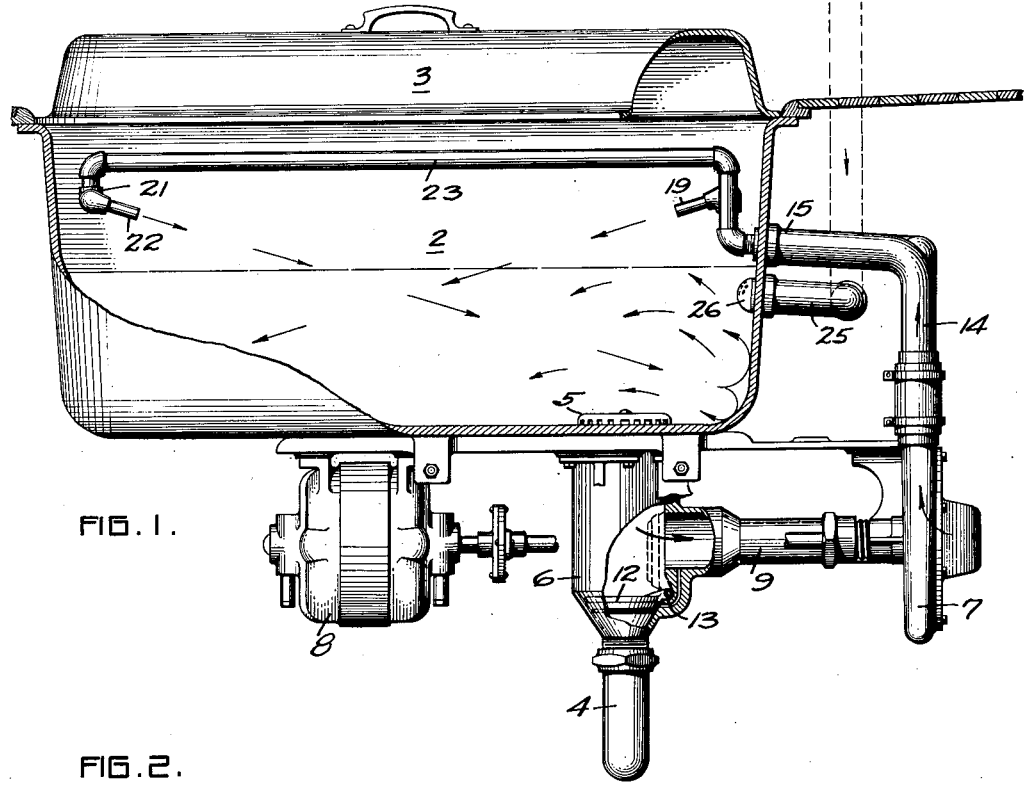
Figure 1 is an elevation, partly in section, of the washing apparatus of my invention arranged to wash clothes.

One of the objects of my invention is to provide a kitchen sink with means whereby the sink is converted into a washing apparatus. The sink may be used in the ordinary way that a kitchen sink is used at present and, when desired, may be converted into a washing apparatus either for washing clothes or washing dishes. By virtue of this invention the kitchen is provided with a clothes washer and a dish washer at small additional expense and without occupying any additional room within the kitchen. The apparatus of my invention is so designed, that by a slight alteration or change of parts, the apparatus may be converted from a dish washer to a clothes washer and vice versa.

The apparatus of my invention comprises a sink 2 which is preferably provided with a removable cover 3, to prevent water splashing from the sink. At the bottom the sink is provided with a drain pipe 4 the inlet to which is guarded by a suitable strainer 5. The upper portion 6 of the drain pipe is made larger in diameter than the lower portion, to provide a valve seat so that the discharge of water from the sink through the drain pipe may be controlled. Means are provided for withdrawing water from the sink and forcibly introducing it into the sink in the form of downwardly inclined streams, which agitate and cause rotation of the body of water in the sink. Clothes emersed in the rotated and agitated water are thoroughly washed.

Arranged in a suitable location, preferably below the sink, is a circulating pump 7 which is driven by the motor 8, suitably mounted with respect to the pump. The inlet pipe 9 of the pump is connected to the enlarged portion 6 of the drain pipe above the valve seat therein and a valve 12, pivoted on the shaft 13 serves to control the flow of water from the sink through the drain pipe 4 and the inlet pipe 9. When the valve 12 is in one position it closes the inlet pipe 9 and opens the drain pipe and when it is in the other position it closes the drain pipe and opens communication between the drain pipe and the inlet pipe. Thus water from the sink may be run to waste or may be recirculated.

Figure 2:
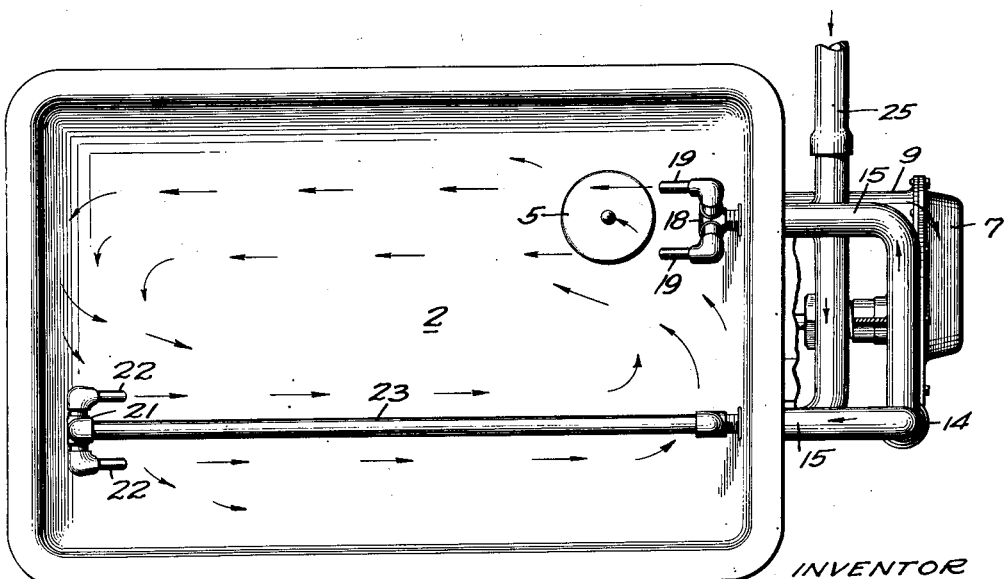
Figure 2 is a top or plan view of the apparatus shown in Figure 1.

The circulating pump 7 is provided with a discharge pipe 14 which communicates with outlet 15 formed in one of the end walls of the sink. When the valve is positioned to close the drain pipe and the motor is in operation water is withdrawn from the sink and discharged into the sink through the outlet 15. These outlets are preferably, although not necessarily, disposed in the same end wall of the sink, although in the construction shown in Figure 3 I have shown one outlet formed in each end wall. When the washing apparatus is to be used for washing dishes, a suitable spray head 16 is screwed into each outlet so that a plurality of jets of water are introduced into the sink in different directions, thereby thoroughly washing the dishes which are placed in the sink. When it is desired to use the sink for washing clothes, the spray heads 16 are removed and nozzle structures substituted in their place. The nozzle structures are provide with screw threaded nipples which screw into the outlet 15, so that the change may be readily made from a dish washer to a clothes washer and vice versa. I prefer to arrange one nozzle structure at each side of the sink and to form these nozzle structures so that they discharge streams of water substantially in opposite directions. One nozzle structure is preferably arranged at one end of the sink adjacent one side wall and the other nozzle structure is preferably arranged at the other end of the sink adjacent the other side wall, as shown in Figure 2, so that the streams of water discharging from the nozzle, cooperate with each other to produce rotation of the body of water in the sink. The nozzles are preferably arranged above the level of the water in the sink and are inclined downwardly, so that they forcibly discharge streams of water into the body of water in the sink, thereby violently agitating the water in the sink and causing the mass of water to rotate. In the structure shown in Figure 2 one nozzle structure 18 provided with two downwardly inclined nozzles 19 is arranged at that end of the sink in which the outlets 15 are formed, the nozzle structure being provided with a short nipple for screwing into the outlet. The other nozzle structure 21, having downwardly inclined nozzles 22, is arranged at the opposite end of the sink and is provided with a long connecting pipe 23, the end of which is threaded to screw into the other outlet in the opposite end of the sink. The pipe 23 supports the nozzle structure 21.

Figure 3:
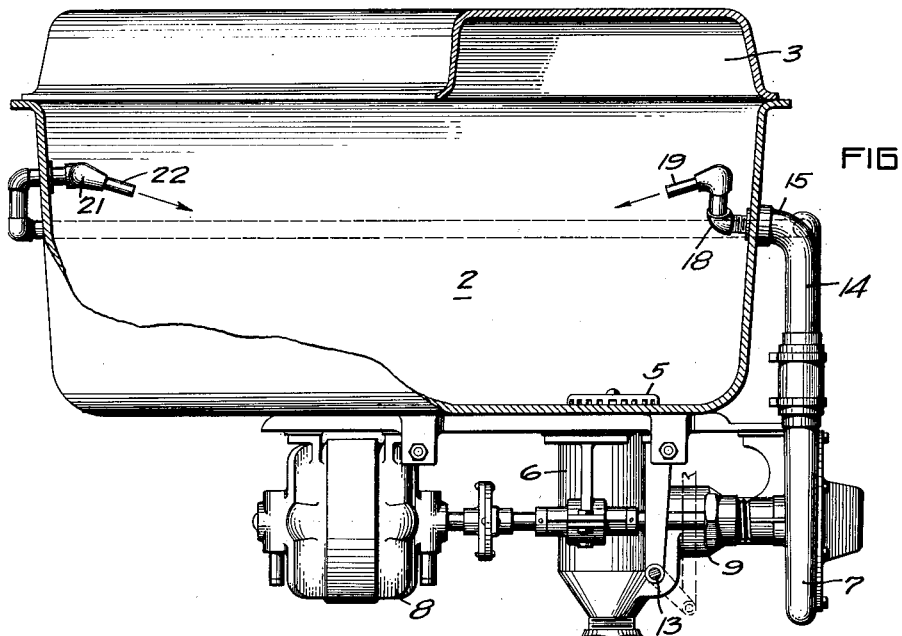
Figure 3 is an elevation partly in section of a modified form of the washing apparatus of my invention.
Figure 4:
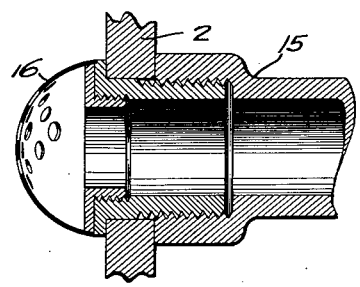
Figure 4 is a detail of the water outlet into the sink, with a spray head secured to the outlet.
Figure 5:
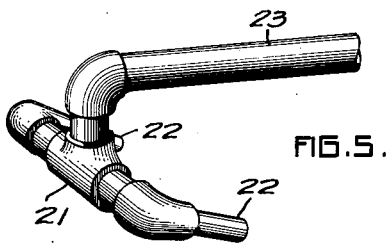
Figure 5 is a perspective view of one of the nozzle structures forming part of my invention and Figure 6 is a perspective view of the other nozzle structure.
Figure 6:
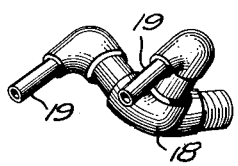

In the structure shown in Figure 3 the opposite end walls of the sink are provided with outlet openings, which communicate with the discharge pipe 14 so that the long extension 23 on the far nozzle is not required.

The different attachments which screw into the outlet opening in the walls of the sink are readily applied or removed, so that the sink may readily be converted to a dish washer or a clothes washer. When it is desired to introduce fresh water into the sink for the purpose of rinsing or otherwise, this water may be introduced through the pipe 25, which is provided on its end with a spray head 26. This pipe however may be eliminated when desired, and water introduced into the sink from ordinary faucets arranged above the sink. By removing the cover access is had to the sink which may be used in the ordinary manner when desired.

I claim:

1. A washing apparatus comprising a sink, means for withdrawing water from the sink and forcibly returning it to the sink, and nozzles extending longitudinally of the sink adjacent the top thereof and arranged adjacent the side of the sink, through which the water discharges into the sink to cause longitudinal movement and agitation of the body of water in the sink.

2. A washing apparatus comprising a sink, a drain pipe connected to the sink, a motor driven pump, a pump inlet pipe connected to the drain pipe, a pump discharge pipe and nozzles on the end of the discharge pipe extending in the direction of the length of the sink and adapted to project streams of water into the sink adjacent the side thereof to cause longitudinal movement and agitation of the body of water in the sink.

3. A washing apparatus comprising a sink, a water outlet in the side of the sink, means for withdrawing water from the sink and forcibly discharging it through said outlet and a nozzle structure having a nozzle extending in the direction of the length of the sink, removably secured to said outlet.

4. A washing apparatus comprising a sink, a drain pipe connected to the sink, a motor driven pump, a pump inlet pipe connected to the drain pipe, a pump discharge pipe opening into said sink above said drain pipe, downwardly inclined nozzles on the end of the discharge pipe adapted to project streams of water into the sink to cause horizontal rotation of the body of water in the sink and valvular means for controlling the flow of water through the drain pipe and the pump inlet pipe.

5. A washing apparatus comprising a sink, a drain pipe connected to the sink, a motor driven pump, a pump inlet pipe connected to the drain pipe, a pump discharge pipe, downwardly inclined nozzles on the end of the discharge pipe adapted to project streams of water into the sink to cause horizontal rotation of the body of water in the sink and a valve adapted in one position to close the inlet pipe and in the other position to close the drain pipe below the inlet pipe opening.

6. A washing apparatus comprising a sink, a circulating pump connected at its inlet side to the lower portion of the sink, distributing pipes connected to the pump discharge, and nozzles on the ends of the distributing pipes, the nozzles being arranged adjacent opposite corners of the sink and pointed in opposite directions, so that water discharging therefrom causes horizontal rotation of the body of water in the sink.

In testimony whereof, I have hereunto set my hand.

JULIUS FASSIO.